United States Patent [19]

Hobson

[11] Patent Number: 4,569,140
[45] Date of Patent: Feb. 11, 1986

[54] THRUST LINE WHEEL ALIGNMENT APPARATUS AND METHOD

[76] Inventor: John A. Hobson, 5317 Benton Ave., Edina, Minn. 55436

[21] Appl. No.: 604,454

[22] Filed: Apr. 27, 1984

[51] Int. Cl.⁴ ............................................. G01B 5/255
[52] U.S. Cl. .................................... 33/203.18; 33/288
[58] Field of Search .................. 33/203.18, 203.2, 288

[56] References Cited

U.S. PATENT DOCUMENTS

| | | | |
|---|---|---|---|
| 3,182,405 | 5/1965 | Taylor | 33/203.8 |
| 3,426,438 | 2/1969 | Wilkerson | 33/203.2 |
| 4,115,926 | 9/1978 | Hampton et al. | 33/288 |
| 4,341,021 | 7/1982 | Bissbarth | 33/203.18 |
| 4,383,370 | 5/1983 | Van Blerk | 33/203.18 |
| 4,402,603 | 9/1983 | Lill | 33/288 |
| 4,481,716 | 11/1984 | Beissbarth | 33/288 |

Primary Examiner—Robert I. Smith
Attorney, Agent, or Firm—Orrin M. Haugen; Thomas J. Nikolai

[57] ABSTRACT

Apparatus and a method for aligning the rolling plane of each of the wheels of a car, truck, trailer or other wheeled vehicle to factory specifications and to be parallel to the thrust line of the rearmost wheels. The apparatus comprises various embodiments of an adjustable stationary reference "halo", mountable in concentric relation about a vehicle or trailer, and relative to which individual gauge assemblies mounted to each of the wheels detects each wheel's toe condition and permits the determination of the vehicle or trailer thrust line and the correction of the rear suspension thereto. Wheel mountable caster, camber and king-pin inclination/strut angle detecting assemblies, in turn, permit the detection of each of these respective conditions for each wheel and the correction of each condition in relation to the established thrust line.

16 Claims, 11 Drawing Figures

THRUST LINE WHEEL ALIGNMENT APPARATUS AND METHOD

BACKGROUND OF THE INVENTION

Apparatus for aligning the wheels of an automobile, truck or trailer suspension system and, in particular, apparatus for aligning the rolling plane of each of the wheels to the thrust line of the rear wheels and/or the geometric center-line of the suspension and as per manufacturer's specifications.

With the scaling down in the size of conventional automobiles, automobile design engineers have changed the suspension system of the typical automobile from the heretofore conventional solid frame construction to a unibody construction and/or some variation thereof, where the front suspension is no longer directly coupled to the rear suspension. Thus, one now encounters independent front and rear suspensions as well as vehicles where each wheel is independently suspended from the others. Due to the redesigning of the suspension systems, however, problems have arisen in ensuring the maintenance of the proper alignment of each of a vehicle's four wheels over time and which problems are not easily cured with available alignment apparatus.

When heretofore one could assume that a vehicle's frame was relatively constant and straight so as to permit a line of sight type adjustment between the front and rear suspensions, this condition no longer holds true. Due to the independent nature of the front and rear suspensions, their respective mountings relative to the vehicle and each other may now vary by design, just as the alignment of each wheel's suspension may become skewed from road hazards. In particular, with unibody construction and the joining of each wheel's suspension to the sheet metal structure of a vehicle, a variety of stresses are now placed on each wheel and the vehicle body that may induce wheel misalignment. Further, misalignment may occur during manufacture, such as where one wheel is set forward or back of the adjacent wheel so as to result in a setback or skewing of one side of the otherwise rectangular suspension. The assumptions of heretofore conventional alignment techniques thus no longer hold true and to employ them quite often results in a vehicle with improper handling characteristics and excessive tire wear, even though it is thought to be properly aligned.

Proper vehicle alignment permits the vehicle to roll in a straight line, with the steering wheel centered. This condition is achieved with the present invention via the aligning of the wheels to the vehicle thrust line and which has been defined as the line bisecting the total rear wheel toe angle or the line perpendicular to the average axes of the two rear wheels.

With the independent mounting of each of the wheels or at least the front and rear wheel suspension pairs, the above alignment condition is achieved by ensuring that each wheel is aligned relative to the others so that the "rolling plane" or imaginary vertical plane through each wheel as it rotates relative to the ground is parallel to the vehicle thrust line and within factory specifications. This end is particularly achieved by first determining the thrust line of the wheels of the rear suspension portion and correcting them to be within factory specifications. Thereafter, the condition of the wheels of the front suspension portion is determined and corrected to be within factory specifications and at the same thrust angle as the rear wheels. Assuming, therefore, that the steering wheel was held in a centered position during these corrections, an operator can be assured that afterwards the rolling plane of each of the wheels will be aligned to specifications and be parallel to the vehicle thrust line.

In order to independently align the four wheels of a conventional automobile, it first becomes necessary to establish a reference of some sort and relative to which reference, each of the wheels may be adjusted. Previously, this reference was the center line of the frame suspension. The present invention, however, achieves its reference by establishing an adjustable rectangular frame or "halo" about a vehicle so as to concentrically circumscribe each of the tires and relative to which halo the geometric center line of the suspension (and which is to be distinguished from the geometric center line of the frame) is determined and the wheels are aligned.

It is accordingly necessary to center the vehicle relative to the halo and which is centered in a concentric, equidistant fashion in one embodiment of the present invention via individual guide pins that are mounted relative to each wheel's hub and via measuring tapes mounted to the halo. Thereafter, individual rolling plane gauge assemblies are coupled to each wheel via respective adjustable three point connecting assemblies that are suitably adjusted to remove all wheel run-out before taking wheel measurements. Thereafter, a toe angle indicating bar is magnetically coupled to the rolling plane gauge along with a magnetic caster/camber detecting gauge. Upon coupling each rolling plane gauge to each wheel, toe condition is directly indicated on individual scales mounted to the halo fore and aft of each wheel. Upon further detecting and correcting the individual toe and camber condition at each rear wheel, the opposite wheels or front wheels are adjusted relative to the rolling plane established for each rear wheel. At the same time, the toe, caster and camber conditions and king-pin inclination or strut angle are measured and corrected as necessary to bring them within factory specifications. Thus, the rolling plane of each wheel is adjusted to be within factory specifications and at the same thrust angle relative to the geometric center line of the vehicle's suspension system.

The present invention thus permits the relative alignment of a vehicle's four wheels in an economical fashion and does not require the use of microprocessor controllers, optical alignment devices or specially designed vehicle support racks, such as are required with more elaborate and costly systems like those manufactured by Hunter Engineering Co., Bridgeton, Mo. Instead, it produces similar results with a less costly assembly that may be used with any of a variety of exiting support racks.

The above objects, advantages and distinctions of the present invention as well as various others will, however, become more apparent upon reference to the following description thereof with respect to the appended drawings. Before referring thereto, though, it is to be recognized that while the present invention is described with respect to three presently preferred embodiments, various modifications may be made thereto by those of skill in the art without departing from the spirit and scope thereof.

SUMMARY OF THE INVENTION

Apparatus and a method for independently aligning the rolling planes of the wheels of a wheeled vehicle relative to factory specifications and to the thrust-line of the vehicle's rear wheels. In one embodiment the apparatus comprises an adjustable rectangular frame or halo mountable about the periphery of an automobile in equidistant, concentric relation thereto. Upon positioning the halo and as necessary, individual rolling plane gauges are attached to each wheel via an adjustable three point spring loaded clamping assembly and each of which assemblies are adjusted to remove any wheel runout. Upon adjusting the clamping assemblies, a magnetically coupled hanger is mounted relative to each wheel's center and to which individual toe, caster and camber detecting assemblies are mounted. Toe angle is thereafter detected relative to individual measuring scales mounted to the halo, fore and aft of each wheel, while caster and camber are detected via a magnetically coupled level detecting assembly mounted to the clamping assembly and coaxial to each wheel's hub.

In a second embodiment, the halo is configured in a slightly different fashion via a folding frame having sliding toe scale members, although measurements are taken in the same way. A third embodiment establishes a halo with parallel lengthwise sides via elastic lines and tapes extending from separate track and toe line gauges mounted to each wheel. Each gauge is adjusted to remove wheel run-out and toe measurements and corrections are made relative to the tapes and elastic lines as they relate, in turn, to index points on the gauge. Caster and camber are read and corrected in the same fashion as for the other embodiments. A variation of this third embodiment also permits the alignment of the wheels of trailers.

In operation and upon determining the thrust-line for the rear wheels, the rolling plane of each of the rear wheels is adjusted to be within factory specifications. Afterwards, the front wheels are adjusted relative to the determined thrust line and as per manufacturer specifications. At the same time, the vehicle's steering wheel is centered relative to the vehicle, such that upon completing the alignment, all of the vehicle's wheels are set within factory specifications and at the vehicle thrust line, while the steering wheel is centered relative to the wheels.

DESCRIPTION OF THE PREFERRED EMBODIMENT

Figure 1:
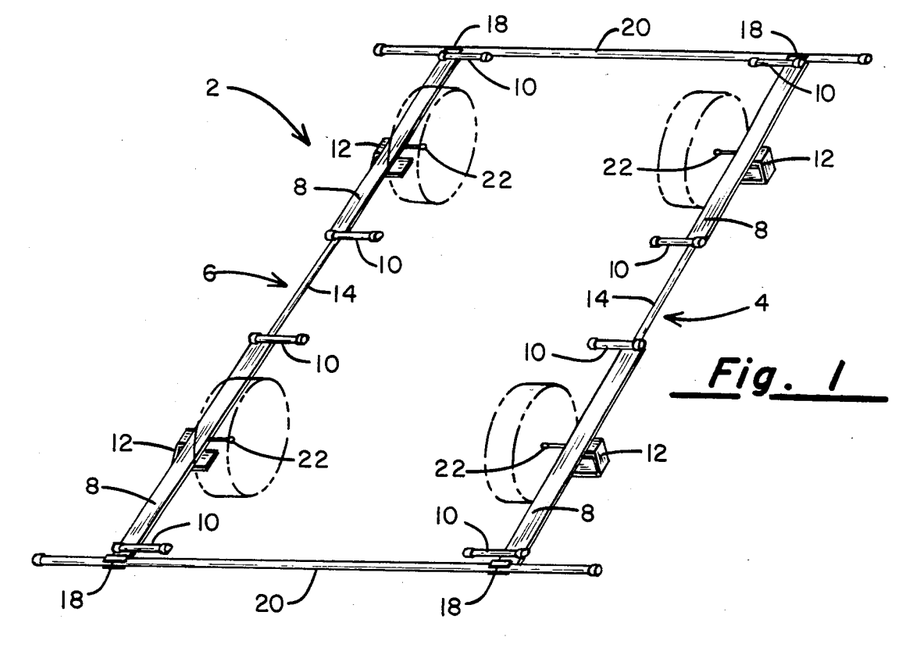
FIG. 1 shows a generalized perspective view of one embodiment of a halo assembly relative to the wheels of a vehicle (shown in phantom).

Referring to FIG. 1, a perspective view is shown of a halo reference assembly 2 for one embodiment of the present invention relative to the four wheels of a typical automobile (shown in phantom). While the halo 2 is shown to be rectangular in shape, it is to be recognized that various other geometric configurations can be employed, so long as the halo 2 circumscribes all of the wheels of the vehicle and permits the centering of the halo 2 in equidistant, concentric relation to each of the wheel pairs and the reading of each wheel's toe condition relative to the halo 2.

Figures 3, 4, 6:
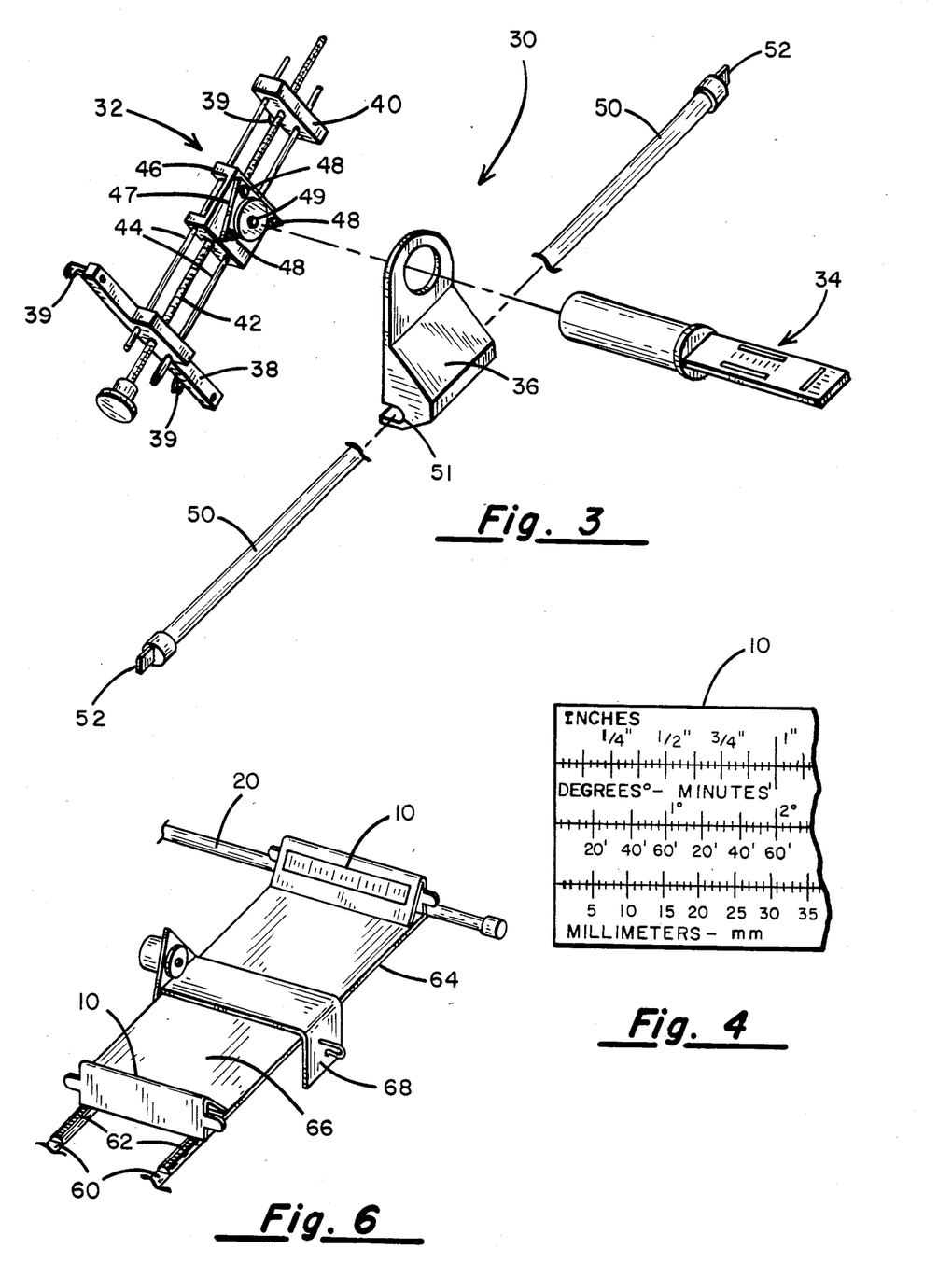
FIG. 3 shows a detailed exploded assembly view of one of the rolling plane gauges.
FIG. 4 shows a portion of one of the toe angle scales.
FIG. 6 shows in partial perspective an alternative embodiment of a halo assembly of a type similar to that of FIG. 1.

Referring to the halo 2 of FIG. 1, it generally comprises a multi-sectioned tubular assembly and the parts of which either interlock with one another in a clamped fashion or in a sliding fashion. Specifically, the right and left sides 4 and 6 each contain a pair of toe indicating tubing sections 8 and to each of which are attached a pair of toe condition detecting scales 10, that mount fore and aft of each wheel, upon positioning each wheel adjacent to one of the tubing sections 8. While the purpose of the scales 10 will be described in greater detail hereinafter, a section of one of the scales is shown in FIG. 4. Generally, though, each of the scales 10 is mounted to the top of each tubing section 8 and normal thereto so as to project inwardly towards the vehicle.

Mounted to the bottom of each tubing section 8 is a support plate 12 and which plates 12 together act to support the halo 2 above the ground at a height approximately level with the bottom of each wheel's rim. Interconnecting each of the tubing sections 8, in turn, are slidable center sections 14 that mount and lock within nylon end caps (not shown) mounted to each tubing section 8. Thus, upon inserting the center sections 14 within the tubing sections 8, the length of each side 4 and 6 of the halo 2 can be adjusted to accomodate the wheel base length of any particular vehicle. For the preferred embodiment and the typical automobile, a wheel base within the range of 50" to 170" inches may be accomodated. Longer wheel bases may also be accomodated by using longer center sections 14.

Mounted to the outermost ends of each tubing section 8 are C-shaped clamp members 18 and which are formed to securely fasten to the end rails 20, that mount at opposite ends of the halo 2. The end rails 20 are typically fabricated as unitary structures approximately 150" long and which upon coupling to the clamps 18 complete the outline of the halo 2.

During the assembly of the halo 2, it is necessary to properly align it with respect to the wheels to ensure a concentric relationship relative to each of the wheels. This condition is established via the aligning of the spring-loaded guide pins 22, that project inwardly from each of the tubing sections 8, relative to each wheel's rim. Specifically, during the assembly of the halo 2, one of the right or left sides 4 or 6 is first assembled to a length so as to place the guide pins 22 for that side at the center of the rim for each of that side's wheels. The end rails 20 are then mounted to the assembled side rail 4 or 6. The opposite side 4 or 6 is then assembled with its guide pins 20 centered to the opposite wheel rims and is attached to the end rails 20, such that the distance between the sides 4 and 6, as measured on scales (not shown) mounted to the end rails 20, is the same in the front and the back of the vehicle. The distance from each pin 22 to its associated wheel is then measured and the halo is repositioned, as necessary, so as to make the pin length the same for each of the front wheels and then after which the length of each rear wheels' pin 22 is adjusted to be the same. A line is then stretched along each side of the vehicle from a point on the toe scale 10 in front of the front wheel to the toe scale 10 in back of the rear wheel. A confirmation is then made that the line crosses the same mark on each of the other two toe scales 10 for that side. Similarly, the toe scales 10 are calibrated for the opposite side, and after which one is assured that the sides 4 and 6 are not bowed. Depending, too, on whether the halo 2 is attached or mounted on a vehicle rack, the halo 2 may be leveled, if the surface upon which it rests is suspected of being grossly out of level. In this fashion, the halo is positioned in concentric level relation to the vehicle.

Once the halo 2 is centered relative to the vehicle, an operator is ready to begin mounting each rolling plane gauge 30 to each wheel (first to the rear wheels) and making a determination of each wheel's toe and camber conditions. The determination of these conditions will be described in greater detail with reference to FIGS. 3, 4 and 5, but before directing attention thereto, it is to be noted that it is not necessary to mount the halo 2 to a special support rack and that within limits it is not necessary to level the tubing sections 8 relative to each other. In passing, it should be noted, too, that the present halo assembly 2 can be adapted to mount on most drive-on racks, such as are used in most service stations or garages, and whereby adjustments can then be more easily made to a vehicle's suspension in-between the taking of measurements. Alternatively, the halo may be supported on the floor in relation to a pit or to conventional turn-table alignment supports, such as where a frame contact rack is used.

Figures 2, 5:
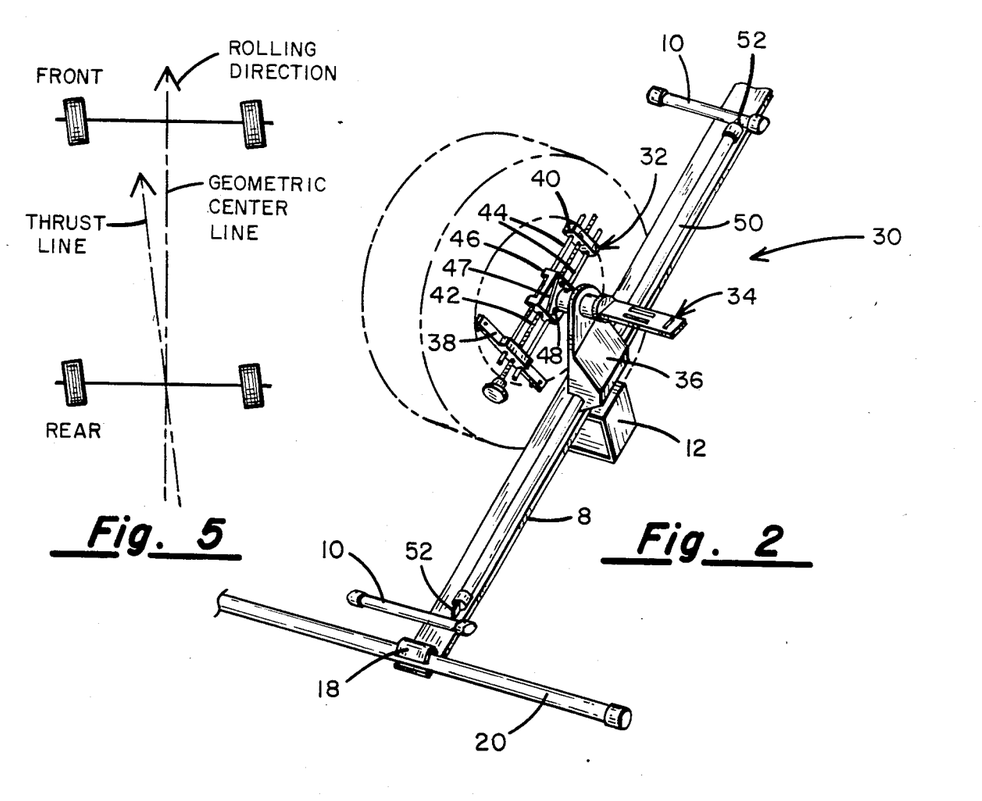
FIG. 2 shows a perspective view of a rolling plane gauge mounted to one wheel of a typical vehicle and relative to a portion of the reference halo.
FIG. 5 shows a suspension's thrust line and geometric center line in an exaggerated view of a typical vehicle's suspension.

Referring now to FIG. 2, a perspective view is shown of a single wheel relative to one of the four rolling plane gauge assemblies 30 that may be mounted to each of the four wheels or initially at least to the two rear wheels, once the position of the halo 2 is established. Before discussing FIG. 2, though, attention is first directed to FIG. 3 and wherein a detailed exploded assembly view is shown of one of the rolling plane gauge assemblies 30. From FIG. 3, it is to be noted that each rolling plane gauge 30 is comprised of a wheel clamping assembly 32, a magnetically coupled caster/camber detecting assembly 34 and a mounting bracket 36 that mounts about and hangs from the assembly 34 and to which a toe plane indicating gauge 37 is magnetically coupled.

Directing particular attention to the clamping assembly 32, it generally comprises an assembly for making a three-point coupling to a wheel's rim. Specifically, a two point, notched member 39 containing, contact member 38, is coupled to a single point, notched member 39 containing, contact member 40 via a threaded screw 42 that is mounted to each contact member 38 and 40 in a screw follower fashion and opposite of each adjacent side of which screw 42 are mounted individual guide bars 44. Thus, upon screwing the guide screw 42 inwardly or outwardly, the contact point members 38 and 40 spread apart or retract to accomodate and cause the notches of the members 39 to mate within the outer curved rim of a given wheel. In particular, the present clamping assembly 32 is sized to accomodate automotive wheels of a diameter from 10" to 16" inches. For larger vehicles, such as semi-tractors, trailers, heavy equipment and the like, a larger diameter clamping assembly 32 would be required. Mounted to the guide bars 44, in turn, is a sliding plate member 46 that may be adjusted to coincide with the center of the wheel's hub or axle end. Mounted above the plate member 46 is a triangular plate 47, that is separated therefrom via three spring-loaded thumb screws 48 that are mounted in adjacent corners of the plate 47.

Because of the geometry of the assembly 32, an operator is assured that the guide screw 42 passes through the center of the wheel and axle and, thus, upon moving the plate 46 along the guide bars 44, it may be positioned at the center of the wheel. Once the clamping assembly 32 is attached to the wheel, the caster/camber detecting assembly 34 is magnetically attached to the center pin 49 on the plate 47 and the thumb screws 48 are adjusted, relative to the spirit levels on the assembly 34 to remove wheel run-out. The wheels are then ready to be aligned. In passing, it should be noted, too, that the present clamping assembly 32 is manufactured by Bishman Manufacturing Co. and that the caster/camber detecting assembly 34 of the present invention is also of conventional construction and is manufactured by Wheel-A-Matic Corp.

Assuming therefore that the halo 2 has been set and that at least the rear wheels of the vehicle have been prepared for alignment, then the caster/camber detector 34 is again magnetically mounted to the runout adjustment plate 47. At the same time, the mounting bracket 36 is suspended from the detector 34 and an elongated toe plane gauge 50 is magnetically coupled to a recess 51 at the bottom of the hanger 36, in relation to the toe scales 10. This condition being shown in FIG. 2.

Returning attention, therefore, to FIG. 2, it is to be noted that once a rolling plane gauge assembly 30 is mounted and run-out adjusted to a wheel, it essentially is mounted in planar parallel relation to the rolling plane of the wheel (i.e. an imaginary longitudinal plane through the wheel), such that upon suspending the toe plane gauge 50 from the mounting bracket 36, the operator can directly read toe angle from the scales 10 and relative to the positions indicated via the wipers 52 mounted in the ends of toe plane gauge 50. Because the adjustments which may be made to the rear wheels are typically minimal, it is typically necessary to only have to determine the toe and camber conditions for these wheels and then adjust the wheels as necessary to bring these conditions within factory specifications. Caster angle may, however, be adjusted for some types of suspensions.

Thus and depending upon the suspension type, one or more of these conditions may not be readily adjusted, but in any case and once the toe condition is determined for each of the rear wheels, then a total toe condition can be determined and from which the bisecting vehicle thrust angle can be determined. For example, attention is directed to FIG. 5 and the line diagram showing an exaggerated thrust line, relative to the suspension's geometric centerline. Generally, though, the vehicle thrust line represents the resultant force vector of the rear wheels relative to the center of the suspension.

In any case, once each of the rear wheels is adjusted to bring its camber and toe condition into factory specifications and knowing the thus corrected thrust line, an operator is ready to align the front wheels in relation thereto. At this point, the operator mounts one of the rolling plane gauge assemblies 30 to each of the front wheels, if not already done, and removes any runout. Thereafter, the operator determines the individual toe, caster and camber conditions and the king-pin inclination or strut angle for the front wheels and makes the appropriate corrections for each, relative to the established thrust line for the rear wheels. In particular, once the thrust line is determined and/or corrected for the rear wheels, the toe condition of each of the front wheels is corrected to be within factory specifications and also parallel to the same thrust line as the rear wheels. Thereafter, each individual front wheel's caster and camber condition and king-pin inclination for older vehicles or strut angle for vehicles with McPhearson strut suspensions is measured and corrected in conventional fashion and after which efforts the rolling planes for each of the wheels should be parallel to the thrust line.

While the foregoing description has assumed a generally symetrical and rectangular vehicle wheel alignment, it is to be noted that oftentimes the separation between either side of the front or rear suspension may differ from the other. One set of wheels may be wider or narrower than the other and/or one or the other of the wheels of each suspension may be set slightly back from the others so as to place a skew in the rectangle and induce a parallelogram vehicle geometry, a trapezoid vehicle geometry or otherwise. Depending upon the amount of misalignment relative to factory specifications, it thus may be necessary to first correct the suspension's misalignment before aligning the wheels with the present apparatus. Once this is done, however, the present invention readily facilitates the alignment of the wheels relative to factory specifications and to the vehicles thrust line. It should be recognized, too, that any such misaligned frame condition is easily detected upon first setting up the halo 2. Also, and upon completing an alignment, it may be that a slight dog track with attendant tire wear may occur, but this condition is to be tolerated, so long as the alignment is within factory specifications.

Directing attention next to FIG. 6, a partial perspective view is shown of an alternative embodiment of the present halo assembly 2. For this embodiment, the halo 2 is comprised of a pair of folding sides, that are hinged at their middles (not shown). Each half of each side is comprised of a pair of parallel rails 60 and to which guides 62 and overlying sliding members 64 are mounted adjacent each wheel. Each member 64, in turn, includes a flat upper plate 66 and to the ends of which the toe scales 10 are mounted. Each end rail 20, is again clamped to each side and adjusted to length during the assembly of the halo 2. Mounted in sliding relation over each sliding plate 66 then is a U-shaped member 68 and through each of which one of the spring loaded centering pins 20 passes, so as to pass beneath the rails 60 and align with the adjacent wheel. Mounting to the members 68, in turn, are the individual support plates 12, but which are not shown. With the exception of these structural differrences, however, the assembly and operation of the alternative embodiment of FIG. 6 remains the same as described previously.

Figure 7:
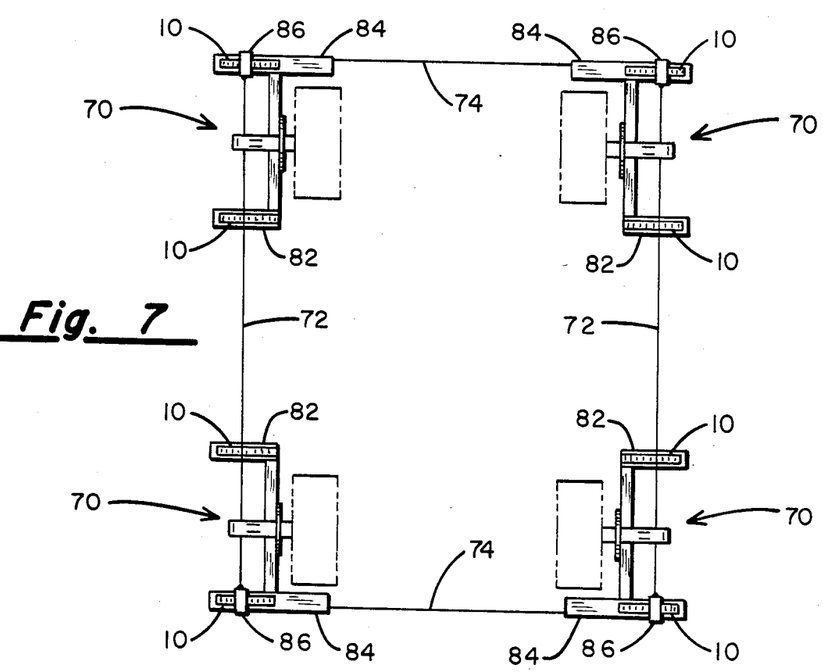
FIG. 7 shows a top view of a third embodiment of the present invention wherein parallel lengthwise sides are established via elastic lines and tapes mounted to individual track and toe line gauges at each wheel.

Directing attention next to FIG. 7, yet another alternative embodiment of the present invention is shown and which, while somewhat different in configuration than the previous embodiments, generally operates in the same fashion. Specifically, from FIG. 7, it is to now be noted that in lieu of a stationary, frame-like halo 2, this embodiment employs four individual track and toe line gauge (TTLG) assemblies 70 and which are individually coupled to each of the vehicle's wheels via modified revisions of the previously described clamping assembly 32. Now, however, in lieu of a solid halo 2, an elastic line 72 is stretched lengthwise between the oppositely mounted pairs of TTLG's 70 on each side of the vehicle. A measuring tape 74 contained within one of the TTLG's at each of the ends of the vehicle is, in turn, extended to the adjacent end mounted TTLG. Thus, now a composite halo is formed about the vehicle, comprised of the elastic lines 72 and measuring tapes 74. These lines and tapes 72 and 74 are thereafter adjusted relative to one another and the toe scales 10 on the TTLG's so as to ensure that, at the least, the elastic lines 72 are parallel to one another and wherefrom measurements of the toe condition for each individual wheel and the thrust line of the vehicle, among other parameters, can be determined. The details thereof will, however, become more apparent upon reference to the following drawings.

Before referring thereto, though, it is to be noted that while elastic lines and tape rules have been employed in other alignment systems, they have been used only as temporary guides in the initial setup of the equipment. The present invention, however, not only uses them to establish a parallel relation of the vehicle to the elastic lines, but also uses them as a reference during ongoing corrections to each wheel's alignment condition.

Figure 8:
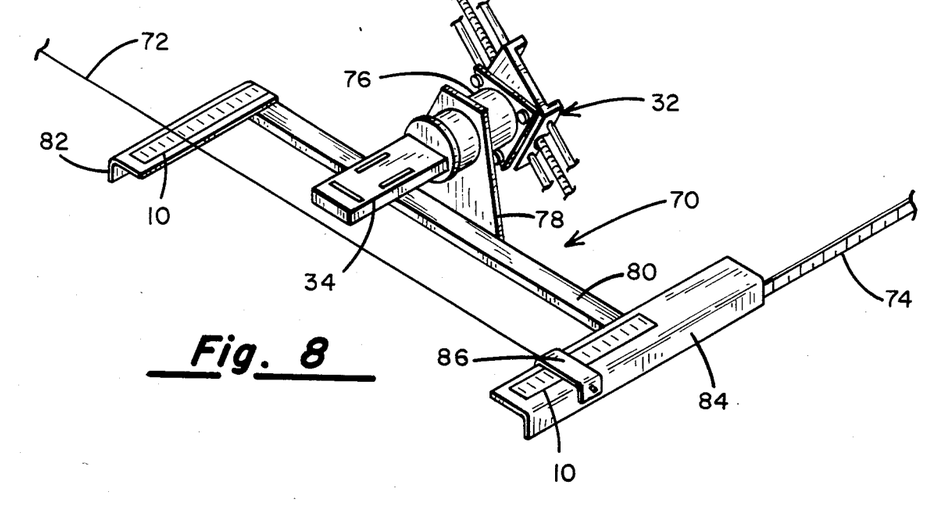
FIG. 8 is a partial perspective view of one of the track and toe line gauges.

Referring now to FIG. 8, a detailed partial perspective view is shown of one of the TTLG's 70 and which it is to be recalled are now attached to each of the wheels of the vehicle. From FIG. 8, it is to be apparent that each TTLG 70 is configured around a clamping assembly 32 of the type previously described. Permanently mounted not to each clamping assembly 32 is an extension 76 that mounts in the center of the plate 47 and from which a bracket 78 is permanently suspended. The bracket 78 now contains caster/camber gauge centering pin 49 (not shown). Attached to the lower end of the bracket 78 is an elongated tubular member 80 and which is of a length slightly larger than the diameter of most automotive and truck tires. Attached to one end of the member 80 and orthogonal thereto is a toe gauge member 82, having a toe scale 10, previously described, mounted to the top thereof. Attached then to the other end of the member 80, also in orthogonal relation thereto, is a second member 84, made from a section of aluminum angle stock, and on the top side of which is another mounted toe scale 10, similar to that on the member 82, and which extends an identical distance orthogonal to said elongated member 80. Also slidably mounted to the member 84 is a sliding index marker 86 and from which the elastic line is extended to the other TTLG 70 at the opposite end of the vehicle. Thus, upon moving the marker 86 relative to the scale 10 at the member 84, an operator can make an objective adjustment of the lateral relationship of the elastic line to the side of the vehicle.

Figure 9A:
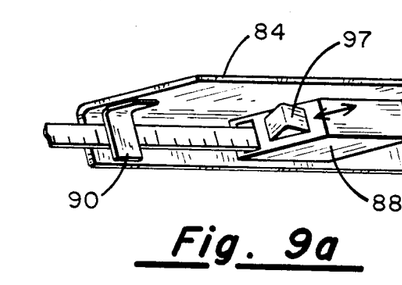
FIG. 9a shows the underside of one of the track and toe line gauges and the relation of one of the slide locked end tapes.

Mounted beneath two of the members 84 are the individual spring loaded, slide locking tape rulers 74 with slide tape locking device 97 and which upon set up are extended to mate within a slot in the oppositely mounted TTLG 70 at the front and rear of the vehicle. In that regard, attention is specifically directed to FIGS. 9a and 9b and wherein the tape related structure is shown. Specifically, FIG. 9a shows a tape supply box 88 mounted beneath one of the end members 84. The tape 74 is spring contained within the tape box 88 such that upon removal, a counter force induced by the internal spring seeks to retract the tape 74. During set up, the tape 74 is extended beneath the lower index marker 90, mounted near the inside lower edge of the end member 84 and whereby an operator can determine an initial setting and incremental changes in toe relative thereto.

Figure 9B:
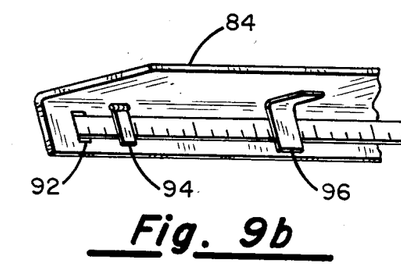
FIG. 9b shows a portion of the underside of the opposite track and toe line gauge which receives one of the end tapes.

From FIG. 9b, a view is shown of the opposite end mounted TTLG 70 and which includes a slot 92 and latch 94 for receiving the end of a tape 74 and holding it during the alignment procedures. Upon coupling the tape 74 to the slot 92, it is passed beneath a second marker 96 and whereby an operator is again provided an index and relative to which incremental changes in toe can be monitored. Thus, during initial setup, one of the tapes 74 is extended laterally at each of the ends of the vehicle so as to provide the operator with a known lateral separation.

Before taking any measurements, an operator must first mount one of the TTLG's 70 to each of the vehicle's wheels and adjust each of the TTLG's to remove run out. Before doing so, though, the operator should preliminarily extend the elastic lines 72 and tape rules 74. Thereafter, and while adjusting each clamping assembly 32 to remove runout, the operator can now monitor the movement of the adjacent elastic line 72 at the toe gauge member 82. Where heretofore an operator during the removal of wheel runout would monitor the spirit levels, of the caster/camber detecting assembly 34, now the operator may make adjustments to the thumb screws, while rotating the wheel and monitoring any movement of the elastic line relative to the scale 10 at the member 82. Upon adjusting the clamping assembly to the point where no line movement occurs, the operator is assured of having removed all wheel runout. In a similar fashion, the operator adjusts each wheel to remove all runout. The operator is thereby assured that each TTLG 70 is in planar parallel relative to the rolling plane of each respective wheel before beginning further measurements or corrections.

Next, the operator must adjust the index marker 86 at each TTLG 70 to align it with the same mark on the scale 10 on the upper portion of each of the members 84. At the same time, the front wheels should be twisted so as to cause the exposed length of the tape 74 at the front end relative to the marker 90 to be the same as that at the rear end. Due to the adjusting of the tape length, it may then be necessary to incrementally reposition the elastic line index markers 86, but after which the operator is assured that each of the elastic lines 72 is parallel to one another, irrespective of the relation of the end tapes 74. In this fashion, a halo 2 with parallel lengthwise sides is configured. The operator is now in a position to read the individual toe, caster and camber conditions for each of the wheels and make the necessary adjustments per factory specifications and to correct the wheels relative to the vehicle thrust line.

In particular and as before, the operator again begins at the rear wheel suspension, but now the toe angle for each wheel can be determined by determining the scaler difference between the points on the two toe scales 10 of the members 82 and 84 over which the elastic line 72 passes. Thus, by subtracting the scale reading of one member from the other, the toe angle is determined for that wheel. Similarly, toe angle is determined for each remaining wheel and corrected per specifications and after which the vehicle thrust line is determined. Camber conditions are also checked and are corrected, to the extent the rear suspension permits.

Upon next determining the toe, caster and camber condition, as well as the king-pin inclination or strut angle for the front wheels, they too are corrected as per factory specifications. Also, when adjusting the front wheel toe angles, the adjustments are again made relative to the previously determined thrust line so as to cause the front wheels to align with the determined thrust line. At this point, it should be noted that for vehicles requiring large amounts of camber correction, it may be desirable to recheck the toe angle measurements to confirm that they have not been shifted out of specification.

It should be noted, too, that the actual adjustment of toe angle for each wheel is facilitated by the mounting of the tape rules 74 and tape locking device 97, relative to the index markers 90 and 96. That is, the operator may now directly monitor each wheels individual movement and corresponding tape movement relative to each related index marker 90 or 96, as he corrects the toe condition at each wheel. Because each tape 74 is spring mounted within each tape box 88 and not immovably locked by the tape locking device 97, it has some forgiveness so as take-up induced slack or feed-out additional tape as the individual toe angle is set, but in either of which cases the changed toe condition is detectable relative to the index markers 90 and 96. Specifically, and once the wheel containing the markers 90 are adjusted, with the tape 74 being fed from or returned to the tape box 88, then the operator would typically extend the tape 74 approximately an inch, so that as the toe angle for the wheels containing the markers 96 are adjusted, movement can again occur and be monitored relative to the markers 76.

In addition to the ability to adjust the aforementioned conditions, it is to be noted that the apparatus of the third embodiment also permits the direct measurement of wheel set back by permitting the operator to measure and compare the distance between wheel centers on opposite sides of the vehicle. In this way, the operator is able to factor into his adjustments any skewing that may be present, due to road conditions or tolerence differences at the factory. Additionally, the apparatus permits one to determine directly whether or not the frame is out of alignment. Specifically, upon establishing parallel elastic lines and knowing the wheel width from the tapes, the operator is able to determine the frame's geometric centerline and relative to which it can be determined whether or not the frame is in alignment at the pinch welds.

Finally, it should be recognized that the apparatus of the third embodiment is also adaptable to trucks, including multi-axled trucks, so as to permit the alignment of each axle's wheels relative to factory specifications and the vehicle thrust line. For example, a semitractor and which has three axles, the operator would mount one TTLG 70 (six total) to each outer wheel of each axle. By then working with two axles at a time, an operator can successively adjust each axle. For example, the operator would typically first establish parallel elastic lines 72 from the rear most and forward most axles in a fashion identical to that above described, and then set the alignment of the rear most wheels and determine the tractor thrust line. The alignment conditions for each of the other axles would then be read directly from the relation of the elastic lines 72 to the remaining TTLG's 70. Adjustments would then be successively made to each axle.

A further advantage of the third embodiment and its use of individual TTLG's 70 is that it can be readily adapted to permit the alignment of the wheels of a towed trailer. In this regard, attention is directed to FIG. 10 and wherein a top view is shown of a two-wheeled trailer. Attached to each rear wheel is a TTLG 70 and attached to the front of the trailer at the hitch or king-pin location is a long bar 99. The length of the long bar 99 is selected to permit it to extend beyond the sides of the trailer. Attached then in sliding relation to each end of the long bar 99 are individual measuring tape containing toe scales 10 and overlying, slidable elastic line index markers 86. Mounted between the long bar scales 10, in turn, is a slide locked tape 74. The individual elastic lines 72 thus now extend along the sides of the trailer from the TTLG's 70 and the long bar 99. A slide locked tape 74 also extends as before between the TTLG's 70.

Figure 10:
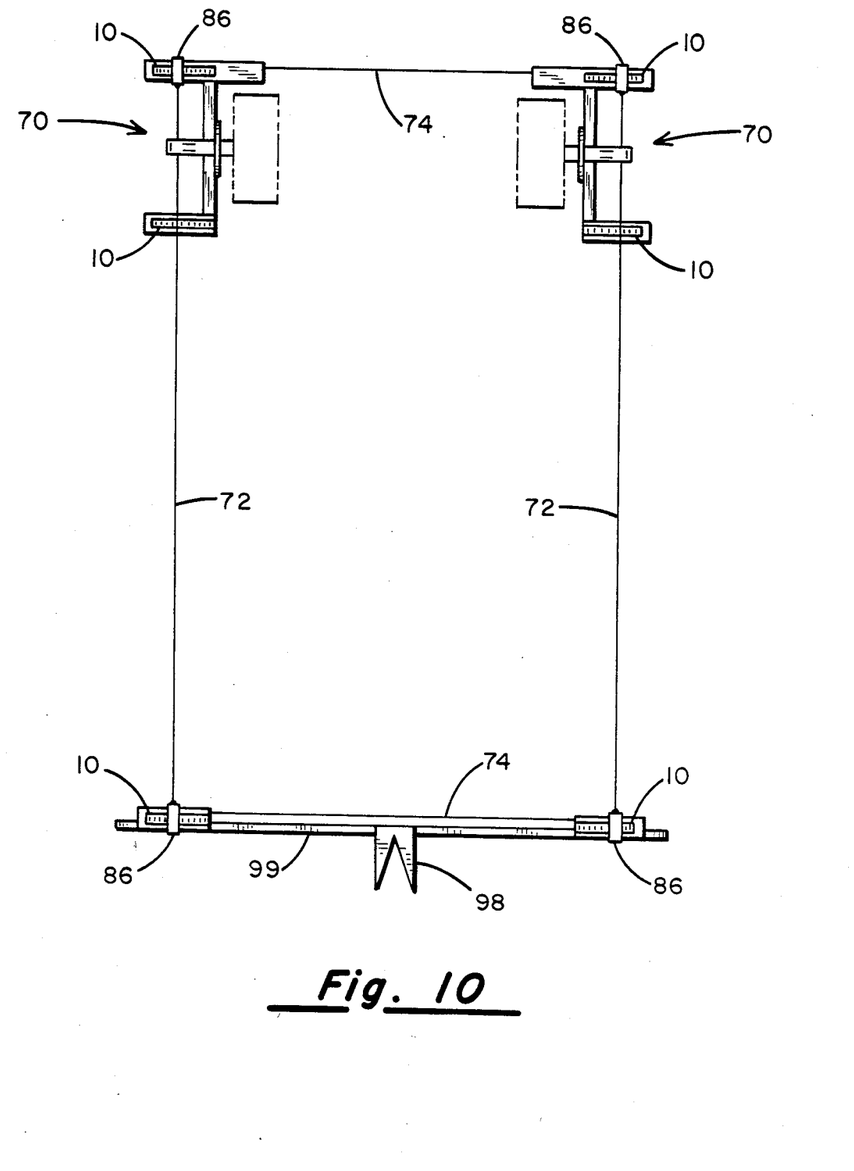
FIG. 10 shows a top view of a modified version of the third embodiment for aligning the wheels of a trailer.

Before wheel measurements can be taken, it is necessary with the above apparatus to first adjust the rear tape 74 and the sliding scales 10 and index markers 86 such that the width between the long bar markers 86 as measured from its tape 74 is equal to the length of the exposed tape 74 at the TTLG's 70. At the same time, each index marker 86 on the long bar 99 should be set to the same point on its associated scales 10 as the index markers 86 at the TTLG's 70 are set on their toe scales 10. Also, it is necessary to ensure that the long bar tape 74 is centered relative to the king-pin or hitch location. Upon performing this set-up procedure, the operator is assured that the elastic lines 72 are parallel to one another and after which he is then ready to take the necessary measurements.

When taking measurements, the operator again reads the toe condition as the scaler difference at each TTLG 70 between the elastic line cross over points on the scales 10 at the members 82 and 84. The caster and camber conditions are also read as before, but now all corrections as they are made to factory specifications are made relative to the king-pin or hitch location. While, too, most trailers would be aligned independently of the towing vehicle, it should be apparent from the above that with the present apparatus the towing vehicle and trailer could be aligned together to ensure that the trailer thrust line correlated with that of the towing vehicle.

It should be apparent from the above, that the present invention offers numerous advantages over prior art devices and especially now permits one to economically and individually align the wheels of automobiles, trucks and trailers. Furthermore, it can be done in conjunction with a variety of available vehicle support and alignment systems.

While the present invention has been described with respect to its presently preferred embodiment, it is to be recognized that various modifications may be made thereto by those of skill in the art without departing from the spirit and scope hereof. It is accordingly contemplated that the following claims should be interpreted to include all those equivalent embodiments within the spirit and scope thereof.

What is claimed is:

1. Wheel alignment apparatus for a wheeled vehicle having front and rear wheel pairs, comprising in combination:
    (a) stationary rectilinear reference means for mounting in predetermined spaced relationship to each wheel of said pairs of wheels during an alignment procedure;
    (b) coupling means adapted to be releasably secured to each of said vehicle's wheels in planar parallel relation to the longitudinal rolling plane through the axis of rotation of each of said wheels;
    (c) means mountable to said coupling means for determining the camber condition of each wheel;
    (d) means mountable to said coupling means for determining the caster condition of each wheel; and
    (e) means mountable to said coupling means for determining the toe condition of each wheel relative to at least one pair of scaler members mounted at each wheel of the vehicle and to said reference means, with one of said scaler members of each pair being positioned forwardly of each wheel, and with the other scaler member of each pair being mounted rearwardly of each wheel.

2. Apparatus as set forth in claim 1 wherein said reference means comprises a multi-sectioned rectangular frame including a plurality of sections having a pair of toe indicating scales mountable fore and aft of each of said vehicle's wheels.

3. Apparatus as set forth in claim 2 wherein each of the sections of said frame includes a guide pin adjustably mountable relative to one of said wheels, whereby a predetermined distance can be established from the frame to each adjacent wheel of the vehicle.

4. Apparatus as set forth in claim 2 wherein said rectangular frame is comprised of a first and second end member, each end member extending acrossed the width of said vehicle and being magnetically mounted to one end of one of a plurality of toe detecting sections, each mounted at one of said vehicle's wheels, said toe detecting sections for the wheels of each lengthwise side of said vehicle being mounted to one another via an extendable member mountable within the other end of each of said toe detecting sections, whereby the pair of toe indicating scales can be adjusted fore and aft of each wheel under inspection so as to indicate the relative toe condition thereof, when said rectangular reference assembly is assembled in concentric relation to the wheels of said vehicle.

5. Apparatus as set forth in claim 4 wherein each of said toe detecting sections includes a spring loaded guide pin extending orthogonal thereto, whereby said reference frame may be adjustably positioned in concentric relation to said vehicle.

6. Apparatus as set forth in claim 1 wherein said reference means includes means laterally, adjustably mounting in centered relation to a wheeled trailer's hitch location.

7. Apparatus as set forth in claim 1 including means for mounting said reference means along the axis of rotation of each of the wheels of said vehicle.

8. Apparatus as set forth in claim 1 including means for mounting at least a pair of opposite lengthwise sides of said reference means in parallel relation to the wheels of said vehicle.

9. Apparatus as set forth in claim 1 wherein said reference means comprises first and second lines suspended on opposite lengthwise sides of said vehicle in parallel relation thereto such that the toe condition of each wheel is determined from the relation of an adjacent one of said first and second lines to said scale members at each wheel.

10. Apparatus as set forth in claim 1 wherein said reference means is comprised of first and second end members and first and second folding side members, wherein said end members mount to said side members to form a frame which circumscribes said vehicle, each of said side members including at least one pair of slidable toe indicating scales mountable fore and aft of an adjacent one of said vehicle's wheels and each side member also including length adjustable means for laterally adjustably positioning the side members so as to mount said reference means in concentric relation to the wheels of said vehicle.

11. Wheel alignment apparatus for a wheeled vehicle including front and rear pairs of wheels comprising in combination:
  (a) a plurality of coupling means, each for coupling to one wheel of said vehicle in planar parallel relation to the longitudinal rolling plane through the central axis of its associated wheel and each including laterally disposed first and second scaler members mountable fore and aft respectively of each associated wheel;
  (b) first and second lines, each extending from two of said coupling means at opposite ends and on opposite sides of said vehicle;
  (c) means for adjustably positioning said first and second lines into parallel relation to one another, said toe condition for each wheel being determined in relation to the scaler difference between the points at which said first and second lines intersect said first and second scaler members at each wheel.

12. Apparatus as set forth in claim 11 including:
means mountable to each of said coupling means for detecting each wheel's camber condition;
means mountable to each of said coupling means for detecting each wheel's caster condition; and
means mountable to ones of said coupling means for detecting the vehicle's associated king-pin inclination or strut angle.

13. Apparatus as set forth in claim 11 including:
first and second measuring tapes laterally extendable between ones of said first and second scaler members at the opposite ends of said vehicle relative to a stationary indicia mark on each of said associated scaler members;
a sliding indicia mounted to each of said tape containing scaler members and from which sliding indicia said first and second lines are suspended;
said sliding indicia and said first and second measuring tapes permitting the positioning of said first and second lines in parallel relation to one another and said stationary indicia showing incremental changes in toe condition at each wheel.

14. Wheel Alignment apparatus for a wheeled trailer comprising in combination:
a plurality of coupling means, each for coupling to one wheel of said trailer in planar parallel relation to the longitudinal rolling plane through the center of its associated wheel and each including laterally disposed first and second scaler members mountable fore and aft of its associated wheel;
an elongated member mountable to one end of said trailer at a hitch location, including third and fourth scaler members slidably mounted therealong;
first and second lines mounted in parallel relation to one another on opposite sides of said trailer from one of said first scale members at the rearmost trailer wheels to one of said third and fourth scaler members;
said toe condition for each wheel being determined in relation to the scaler difference between the points at which said first and second lines cross over said first and second scaler members at each wheel.

15. Apparatus as set forth in claim 14 including first and second measuring tapes respectively, laterally extendable between said first scaler members at the rearmost end of said trailer and said third and fourth scaler members relative to a stationary indicia mark on each associated scaler member;
a sliding indicia mounted on each of the first scaler members at the rearmost wheels and at said third and fourth scaler members and from which said first and second lines extend; and wherein
said second measuring tape extending between said third and fourth scaler members is centered relative to said hitch location and said sliding indicia at said first and third and first and fourth scaler members are adjusted to align said first and second lines in parallel relation to each other.

16. An improved method for aligning the toe, caster, camber and king-pin inclination or strut angle conditions of each wheel of a wheeled vehicle having front and rear pairs of wheels and comprising the steps of:
  (a) positioning a stationary reference assembly about the periphery of said vehicle in a predetermined relation to each wheel thereof;
  (b) mounting a multi-point clamp assembly to each wheel of said vehicle in planar parallel alignment with the rolling plane through the longitudinal center of each of the wheels of said vehicle;
  (c) coupling camber and caster detecting means to said clamp assembly in centered relation to each of said wheels;
  (d) mounting a toe angle detecting assembly to said clamp assembly;
  (e) measuring the toe condition of each wheel relative to said reference assembly and a pair of scaler members fore and aft of each of the wheels of said vehicle and correcting the toe condition of each wheel relative to predetermined factory specifications;
  (f) determining a thrust line for said rear wheels;
  (g) measuring and correcting the camber condition for each of the rear wheels of said vehicle relative to predetermined factory specifications;
  (h) determining the individual toe, caster, camber and king-pin inclination or strut angle conditions for each front wheel of said vehicle; and
  (i) correcting the individual toe, caster, camber and king-pin inclination or strut angle conditions at each front wheel in relation to said predetermined factory specifications and to be parallel to said thrust line.

* * * * *